United States Patent [19]

Dodd et al.

[11] 4,343,655

[45] Aug. 10, 1982

[54] INSOLUBILIZERS FOR BINDERS FOR PAPER COATING COMPOSITIONS

[75] Inventors: John A. Dodd; Robert L. Lane, both of Rock Hill, S.C.

[73] Assignee: Sun Chemical Corporation, New York, N.Y.

[21] Appl. No.: 265,609

[22] Filed: May 20, 1981

Related U.S. Application Data

[63] Continuation-in-part of Ser. No. 92,631, Nov. 8, 1979, abandoned.

[51] Int. Cl.³ .......................... C08B 31/00; C08L 3/00
[52] U.S. Cl. ..................................... 106/214; 106/213; 428/533
[58] Field of Search ................. 548/317; 106/210, 213

[56] References Cited

U.S. PATENT DOCUMENTS

| | | | |
|---|---|---|---|
| 3,119,834 | 1/1964 | Walles | 548/317 |
| 3,869,296 | 3/1975 | Kelly et al. | 260/17.3 |
| 4,284,758 | 8/1981 | North | 528/245 |

FOREIGN PATENT DOCUMENTS

| | | | |
|---|---|---|---|
| 631439 | 11/1961 | Canada | 548/317 |
| 984966 | 3/1965 | United Kingdom . | |

OTHER PUBLICATIONS

Japanese Laid Open application No. J5 3044-567, Sep. 30, 1976.

*Primary Examiner*—Theodore Morris
*Attorney, Agent, or Firm*—Cynthia Berlow

[57] ABSTRACT

Paper coating compositions contain at least one pigment, at least one binder, and as an insolubilizer for the binder an alkylated product of the reaction of glyoxal and a cyclic urea.

7 Claims, No Drawings

INSOLUBILIZERS FOR BINDERS FOR PAPER COATING COMPOSITIONS

This application is a continuation-in-part of application Ser. No. 092,631 (filed Nov. 8, 1979) now abandoned.

This invention relates to paper coating compositions. More particularly it relates to novel products for insolubilizing the binders in coatings for paper.

BACKGROUND OF THE INVENTION

Paper coating compositions are generally a fluid suspension of pigment, such as clay with or without titanium dioxide, calcium carbonate, or the like, in an aqueous medium which includes a binder, such as starch, protein, or latex, to adhere the pigment to the paper.

The hydrophilic nature of the binder requires the presence of an insolubilizing material which crosslinks the binder, making it hydrophobic and thus improving the characteristics of the surface of the coated paper.

The most widely-used crosslinking materials are glyoxal and formaldehyde-donor agents such as melamine-formaldehyde, ureamelamine-formaldehyde, and partially or wholly methylated derivatives thereof.

Glyoxal is a highly reactive monomer which cures quickly and has excellent insolubilizing properties. As a result of this rapid crosslinking of glyoxal and binder, however, the viscosity of the coating composition increases so rapidly and is so great that the composition cannot be used. Frequently glyoxal-insolubilized coatings gel completely, particularly in high solids formulations; gelling can occur also in moderate or low solids formulations if they are not used promptly. Thus in situations where it is required that the viscosity remain stable for many hours, for example when high solids coatings are to be applied by blade coating techniques, a glyoxal system is unsuitable.

Melamine-formaldehyde resins do not build viscosity in the coating compositions, but they have the disadvantage of having an unpleasant odor and of releasing free formaldehyde. Curing with such resins involves the crosslinking of the binder molecule with the methylol or methylated methylol group of the melamine resin, usually in an acid or neutral coating, and full insolubilization of the binder takes place slowly over a period of several days. Free formaldehyde can be released either directly from the coating mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the coatings and who treat and handle the coated paper.

The use of the reaction product of urea and glyoxal as an insolubilizer is known (U.S. Pat. No. 3,869,296). Treating agents formed by the reaction of ethylene urea with glyoxal are disclosed in Japanese publication No. 5 3044-567, but they too do not have satisfactory properties.

SUMMARY OF THE INVENTION

It has been found that the alkylated products of the reaction of glyoxal an cyclic ureas are excellent crosslinking resins for binders for paper coating compositions. They do not build viscosity as does glyoxal; they do not contain or evolve free formaldehyde; and, in smaller amounts, they have insolubilizing effects similar to those of the previously known agents.

DETAILED DESCRIPTION OF THE INVENTION

In accordance with the present invention, novel compounds are prepared that are useful for insolubilizing starch, etc. They are generally prepared by condensing in approximately stoichiometric quantities one or more cyclic ureas and glyoxal and alkylating the resulting condensate.

The cyclic ureas which may be used have the following general formulas:

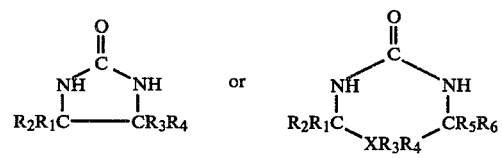

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms, and X may be C, O, or N; when X is 0, $R_3$ and $R_4$ are each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, and the like, and mixtures of these.

The alkylated condensates can be prepared by any suitable and convenient procedure. The cyclic urea and the glyoxal are generally reacted in stoichiometric amounts, although a slight excess of either of the reactants may be employed. The general range of glyoxal:cyclic urea is about 0.5–2:1 and preferably is about 0.8–1.2:1. The reaction may be carried out within the temperature range of room temperature up to reflux, but preferably it is run at about 50° to 60° C. for about two hours. The pH may range from about 2.0 to 7.0, and preferably it is within the range of about 5.0 to 7.0. The product is a water-soluble oligomer. These glyoxal/cyclic urea condensates are then partially or wholly alkylated, e.g., by reacting them with an alcohol such as methanol, ethanol, n-propanol, a butanol, and the like, and their mixtures. Another method involves reacting glyoxal with an alkylated cyclic urea.

The treating agent of this invention has reactive sites capable of reacting within the cellulosic hydroxyl group, thus binding the starch or protein molecules in the coating composition. Because of its polymeric nature, the product is capable of reacting with several binder molecules, leading to greater insolubilizing efficiency and so requiring less of the product of this invention than of glyoxal or of a melamine-formaldehyde resin to accomplish the same degree of insolubilization. The polmer is not excessively reactive, as is glyoxal, so no viscosity build-up takes place in the coating composition. Since there is no formaldehyde in the system, the problems found with free formaldehyde are avoided.

The binders used in the paper coating compositions of this invention include, but are not limited to, unmodified starch; oxidized starch; enzyme-converted starch; starches having functional groups such as hydroxyl, carbonyl, amido, and amino groups; proteins, such as casein; latexes, such as styrene-butadiene resin; and the like, and their mixtures.

The pigments may be clay with or without titanium dioxide and/or calcium carbonate, and the like, and mixtures thereof.

In addition to the binder, the pigment material, and the insolubilizer described above, paper coating compositions may also include conventional materials such as lubricants, defoamers, preservatives, colored pigments, and the like, in conventional amounts.

In the paper coating compositions described herein, the amount of binder is based upon the amount of pigment; the ratio varies with the amount of bonding desired and with the adhesive characteristics of the particular binder employed. In general the amount of binder is about 10 to 25 percent, and preferably about 12 to 18 percent, based on the weight of the pigment.

The amount of insolubilizer varies with the amount and properties of the binder and the amount of insolubilization desired; in general it is about 2 to 10 percent, and preferably about 3 to 7 percent, based on the weight of the binder.

The total solids content of the composition generally is within the range of about 40 to 70 percent, depending upon the method of application and the product requirements.

The compositions of this invention can be applied to paper or paper-like substrates by any known and convenient means.

In order that the present invention may be more fully understood, the following examples are given by way of illustration. No specific details contained therein should be construed as limitations on the present invention except insofar as they appear in the appended claims. Unless otherwise specified, all parts and percentages are by weight.

EXAMPLE 1

290 Parts (2 moles) of a 40% aqueous solution of glyoxal was adjusted to pH 6.5 with sodium bicarbonate. 176 Parts (2 moles) of ethylene urea was added and the temperature raised to 55°±5° C. The mixture was stirred at this temperature for two hours, maintaining the pH between 6.0 and 7.0. After two hours 200 parts (6.25 moles) of methanol was added and the pH adjusted to about 3.0 with concentrated sulfuric acid. The reaction was held at reflux for three hours to effect methylation, the resin solution cooled to 30° C., and the pH adjusted to about 7.0 with a 25% solution of caustic soda.

The product was a clear viscous liquid, pale yellow, with negligible odor. The reaction was essentially complete, as determined by IR and NMR analyses. IR analysis indicated that methylation had occurred.

EXAMPLE 2

360 Parts (2.5 moles) of a 40% aqueous solution of glyoxal was added to 905 parts (2.5 moles) of a 44% methanol solution of dimethyl methoxy propylene urea. The mixture was heated to 55°±5° C. for two hours, the pH being maintained between 6.0 and 7.0. After cooling at 30° C. there was obtained a 45%-solids, slightly viscous, water-white solution with no odor of formaldehyde. The reaction was essentially complete, as determined by IR and NMR analyses.

EXAMPLE 3

The procedure of Example 1 was repeated except that the glyoxal was reacted with each of the following instead of ethylene urea: propylene urea, uron, tetrahydro-5-(2-hydroxyethyl)-1,3,5-triazin-2-one, and 4,5-dihydroxy-2-imidazolidinone. The results was comparable.

EXAMPLE 4

The procedure of Example 1 was repeated except that each of the following alcohols was used instead of methanol: ethanol, n-propanol, and isopropanol. The results were comparable.

EXAMPLE 5

(A) A clay slip was prepared as follows:
To 600 parts of water in a 2-liter steel beaker were added 2.5 parts of tetrasodium polyphosphate and 2.0 parts of sodium polyacrylate with agitation which was continued until the ingredients were dissolved. With slow agitation and using a high shear mixer, 1400 parts of #1 clay was sifted into the mixture and agitation was increased and continued for about 10 minutes until a smooth slurry was obtained.

(B) 168 Parts of starch (Penford Gum 280, Penick & Ford's hydroxyethylated starch) was dispersed in 504 parts of water, and the dispersion was heated to boiling. The solution was then cooled for about 15 minutes, added to the clay slurry of part (A), and calcium stearate added as a lubricant.

The resultant slurry was then used in aliquots with the various insolubilizers. The starch binder was used as a 25% solution, expressed as solids based on clay solids. The latex was used as a 50% emulsion, expressed as solids based on clay solids. The calcium stearate lubricant was used as a 50% emulsion.

The coating compositions were applied to 46 #/ream paper with an 8# Meyer applicator, using a draw-down technique.

Viscosity was measured with a Brookfield Viscometer after the coating had remained at room temperature for a specified time.

Insolubilization was measured with an Adams Wet-Rub Tester (Montague Machine Co., Turners Falls, Mass.). The results are reported as the weight in grams of coating removed from the substrate; the less the removal of the coating solids, the better the degree of insolubilization.

The results are tabulated below.

TABLE 1

|  | (1) | (2) | (3) | (4) | (5) | (6) |
|---|---|---|---|---|---|---|
| #1 Clay | 100 | 100 | 100 | 100 | 100 | 100 |
| Starch | 12 | 12 | 12 | 12 | 12 | 12 |
| Latex | 6 | 6 | 6 | 6 | 6 | 6 |
| Calcium stearate | 1 | 1 | 1 | 1 | 1 | 1 |
| Insolubilizer |  |  |  |  |  |  |
| A | 4.7 | 3.2 | — | — | — | — |
| B | — | — | 8.0 | 10.0 | — | — |
| C | — | — | — | — | 4.2 | — |
| Viscosity (cps after 6 hours) | 7200 | 7100 | 6300 | 6100 | 14100 | 7500 |
| Adams wet-rub |  |  |  |  |  |  |
| 1 day | .0067 | .0072 | .0068 | .0064 | .0065 | .0101 |

TABLE 1-continued

|  | (1) | (2) | (3) | (4) | (5) | (6) |
|---|---|---|---|---|---|---|
| 3 days* | .0076 | .0082 | .0081 | .0079 | .0076 | .0120 |

*Adams wet-rub 3-day figures should be compared to each other, not to the 1-day figures; inconsistencies in sheet drying result in apparent reversal of the 1- and 3-day values.
Latex is Dow 620, a styrene-butadiene resin latex solution Insolubilizer A is the product of Example 1 (45% solids) B is melamine-formaldehyde (80% solids) C is glyoxal (40% solids)

From these data it can be seen that glyoxal (5) is the most effective insolubilizer, but the viscosity build-up after 6 hours would make it unsuitable for use in a paper coating composition. The product of this invention (1) and (2) is a more effective insolubilizer than melamine-formaldehyde (3) and (4) on an as-is basis and is approximately twice as effective on a solids basis. After 6 hours the product of this invention produced no significant viscosity build-up. Column (6) represents a coating containing no insolubilizer.

EXAMPLE 6

The procedure of Example 5 was repeated with other ingredients and amounts. The results are tabulated below.

TABLE II

|  | (1) | (2) | (3) | (5) | (6) |
|---|---|---|---|---|---|
| #2 Clay | 100 | 100 | 100 | 100 | 100 |
| Starch | 15 | 15 | 15 | 15 | 15 |
| Latex | 3 | 3 | 3 | 3 | 3 |
| Calcium stearate | 0.8 | 0.8 | 0.8 | 0.8 | 0.8 |
| Insolubilizer |  |  |  |  |  |
| A | 3.0 | — | — | — | — |
| B | — | — | 10.0 | — | — |
| C | — | — | — | 4.5 | — |
| D | — | 3.0 | — | — | — |
| Viscosity (cps after 2 hours) | 14,100 | 14,600 | 12,300 | 46,000 | 14,400 |
| Adams wet-rub |  |  |  |  |  |
| 1 day | .0113 | .0106 | .0115 | .0092 | .0184 |
| 3 days | .0089 | .0092 | .0089 | .0076 | .0174 |

Starch is Penford Gum 280
Latex is Dow 620
Insolubilizers A, B, and C are as in Example 1; D is the product of Example 1 at 65% solids.

From these data it can be seen that glyoxal (5) is the most effective insolubilizer, but its viscosity after 2 hours is unsatisfactory. The products of this invention (1) and (2) are more effective insolubilizers than melamine-formaldehyde (3) even at reduced use levels. After 2 hours the products of this invention produced no significant viscosity build-up. Column (6) represents a formulation that does not contain an insolubilizer.

EXAMPLE 7

The procedure of Example 5 was repeated with other ingredients and amounts. The results are tabulated below.

TABLE III

|  | (1) | (2) | (3) | (5) | (6) |
|---|---|---|---|---|---|
| #2 Clay | 88 | 88 | 88 | 88 | 88 |
| Starch | 21 | 21 | 21 | 21 | 21 |
| CaCO$_3$ | 10 | 10 | 10 | 10 | 10 |
| TiO$_2$ | 2 | 2 | 2 | 2 | 2 |
| Insolubilizer |  |  |  |  |  |
| A | 4.3 | 2.6 | — | — | — |
| B | — | — | 12.0 | — | — |
| C | — | — | — | 5.2 | — |
| Adams wet-rub |  |  |  |  |  |
| 2 days | .0116 | .0236 | .0347 | .0021 | .0334 |
| 6 days | .0065 | .0121 | .0251 | .0015 | .0281 |
| Viscosity (cps after 15 minutes) | 2000 | 1860 | 1740 | 22,000 | 1940 |

The superiority of the product of this invention (1) and (2) over melamine-formaldehyde (3) and glyoxal (5) is clear from the data in this table.

EXAMPLE 8

The procedure of Examples 6 and 7 was repeated with the product of Example 2 instead of that of Example 1. The results were comparable.

EXAMPLE 9

To illustrate the superiority of an alkylated glyoxal/cyclic urea condensate over a nonalkylated glyoxal/cyclic urea condensate the following experiments were carried out:

(1) 176 Parts of ethylene urea (2 moles) was reacted with 320 parts of 40% glyoxal (2.2 moles) at a pH of 6 and a temperature of 50°–60° C. for two hours. The product was then reacted with 200 parts of methanol (6.25 moles) at pH 3.0, and then adjusted to pH 6.0 and 45% solids. The temperature was lowered to, and held at, 48° C., and viscosity measurements were taken at intervals with a Brookfield Viscometer.

(2) 176 Parts of ethylene urea (2 moles) was reacted with 320 parts of 40% glyoxal (2.2 moles) at a pH of 6 and a temperature of 50°–60° C. for two hours. The product was adjusted with water to 45% solids. The temperature was lowered to, and held at, 48° C., and viscosity measurements were taken at intervals with a Brookfield Viscometer.

TABLE IV

| Viscosity, cps |  | (1) | (2) |
|---|---|---|---|
| initial |  | 52 | 26.5 |
| after weeks | - 1 | 65 | gelled |
|  | - 2 | 107.5 |  |
|  | - 3 | 115 |  |
|  | - 4 | 127.5 |  |
|  | - 8 | 210 |  |
|  | - 9 | 232 |  |
|  | - 10 | 240 |  |

(1) is an alkylated glyoxal/cyclic urea condensate.
(2) is a nonalkylated glyoxal/cyclic urea condensate.

From these data it can be seen that the nonalkylated product (2) was unstable, gelling in one week, whereas the alkylated product (1) remained stable after 10 weeks at 48° C.

The novel products of this invention do not contain or evolve free formaldehyde, as do the conventional melamine-formaldehyde and urea-melamine-formaldehyde crosslinking agents. Smaller amounts of the reactants of this invention produce insolubilizing effects comparable to those of conventional materials. They satisfactorily insolubilize the pigment binders, but do not build viscosity as does glyoxal.

What is claimed is:

1. A paper coating composition comprising a pigment, a binder, and as an insolubilizer for the binder the partially or wholly alkylated product of the reaction of approximately stoichiometric amounts of glyoxal and at least one cyclic urea.

2. The composition of claim 1 wherein the amount of insolubilizer is about 2 to 10 percent, based on the weight of the binder.

3. The composition of claim 1 wherein the amount of insolubilizer is about 3 to 7 percent, based on the weight of the binder.

4. The composition of claim 1 wherein the binder is a starch.

5. A process for insolubilizing the binder in a paper-coating composition which comprises including in the composition about 2 to 10 percent, based on the weight of the binder, of the reaction product of claim 1.

6. The process of claim 5 wherein the amount of the insolubilizer is about 3 to 7 percent, based on the weight of the binder.

7. A cellulosic substrate coated with the composition of claim 1.

* * * * *